REMUS F. CAROSELLI,
ALFRED MARZOCCHI &
S. MARTIN BILLETT
INVENTORS

United States Patent Office 3,029,589
Patented Apr. 17, 1962

3,029,589
EXTENSIBLE FIBROUS GLASS TEXTILE STRAND
AND METHOD OF PRODUCING SAME
Remus F. Caroselli and Alfred Marzocchi, Cumberland, and S. Martin Billett, Esmond, R.I., assignors to Owens-Corning Fiberglas Corporation, a corporation of Delaware
Filed Dec. 30, 1958, Ser. No. 783,782
6 Claims. (Cl. 57—153)

This invention relates to composite strand structures of two or more materials, one of which has a high modulus of elasticity, and another an extremely low modulus of elasticity. More particularly, the invention relates to textile strand structures made up of bundles of glass filaments embedded in a matrix of an elastomeric material twisted and plied with similar composite structures to form a yarn which may in turn be plied with other such structures to form cords or ropes.

Glass fibers, it is well known, have many desirable features for textile purposes, among which are inertness to deterioration of the base material, high tensile strength, and a high modulus of elasticity. For many applications, however, the latter is a limiting factor in that, for example, the high modulus will in many cases limit the adaptability of the glass fibers to special applications where extensibility is desirable. Continuous glass fibers in yarn form are limited in their extensibility usually to less than 3%, and in addition, have practically no yield point. Such lack of extensibility in many cases makes the fibers unuseable for special purposes, such as for fabrics where conformability is desirable, or for reinforcement of working materials such as rubber in tires or in V-belts for a power transmission.

According to the present invention, however, a composite structure of continuous glass fibers and rubber-like materials are combined to permit utilization of the desirable features of glass fibers, such as their tensile strength, and at the same time lend an extensibility which imparts to the composite structure a high flex strength, making the glass fibers adaptable for many uses to which they heretofore have been impossible to apply.

The composite yarn structure produced according to the present invention incorporates as a matrix a low modulus material such as an elastomeric material like rubber which also acts as a protective sheath for the bundle of continuous glass fibers completely embedded within. The combination of the glass fibers with the elastomeric material, in a sense, involves a mismatching of the stress-strain characteristics of different materials, or in other words, a matching of materials having different stress-strain characteristics, so that in use, the composite structure evidences properties complementarily embodying the individual characteristics of the separate materials.

For example, yarns made of continuous glass fibers encased in a combination sheathing and impregnant of rubber-like material when subjected to forces establishing a high strain level, has a high stress produced in the glass fibers with practically negligible stress developed on the more extensible matrix material. The rubber-like matrix material distributes the tension and compression forces imparted, such as is encountered in bending, and distributes the load among a larger number of the filaments than would otherwise be experienced under corresponding conditions with non-resiliently coated glass fiber yarns. Additionally, the elastomeric matrix by preventing stress concentration in the relatively non-extensible glass fibers embodied in a strand, yarn, or cord, improves the resistance to changing loads such as occur during extension, bending, compression, and shear. Improvement in characteristics in this respect resolve themselves in even more important properties of improved fatigue, flex, and wear life.

The presence of a matrix of resilient material prevents a strand or yarn from being bent on itself to the degree that would be allowed if the matrix were not present. The bend radius of a composite yarn having a sheath and impregnant of rubber-like material is prevented from becoming sufficiently small to allow breakage of single filaments and can limit the minimum radius to a value greater than that which would effect a breaking of the individual filaments.

The process by which the product of the present invention is produced involves an impregnation and sheathing of a bundle of twisted continuous glass filaments with an elastomeric substance having a high degree of compressibility and extensibility, and after the impregnating and coating operation, a curing or setting of the substance in position throughout with the fibers integrally fixed in position within the matrix. After curing, the composite form comprising the bundle of fibers integrally embedded within its surrounding matrix, is partially untwisted as a single unit to produce a more balanced structure. That is, the twisted bundle of glass filaments in being untwisted against the forces of the impregnating and coating material results in a composite structure having the forces of the fibers acting in one rotational direction, while the forces of the impregnant and coating material which is twisted from its normal set condition of original application to the bundle, act in a direction opposing the forces of the bundle of fibers. Thus, in untwisting the composite structure from the original twisted condition of the glass filaments, a less wild structure or condition is provided. It will be recognized that the untwisting is conducted to the degree which is desired and dictated by the end product in which the composite structure is to be utilized. An inherently balanced monofilamentary composite yarn incorporating the principles of this invention can be provided by merely untwisting a single composite component, but where the component is to be plied with other similar components, the degree of untwist is dictated by the amount of twist to be imparted during plying of such component with the other components.

By combining two or more strands or yarns into plied yarns, cords, ropes, or cables, the compressibility of the matrix and coating material lowers the initial modulus and permits better load distribution among the groups of yarns or cords than is otherwise possible. As indicated, the twisting and plying of coated yarns of a composite of glass fibers and a rubber-like matrix improves the elongation, but in a more important and novel sense, the extensibility can be limited to a fixed amount. That is, because of the low extensibility of the glass fibers, stress concentration can be readily developed in them upon application of forces lengthwise of the composite structure, but in a twisting and plying structure, there is always more space between adjacent filaments in the structure containing air or compressible cushioning material that will be taken up or displaced before the applied load can be transmitted to the glass fibers so that a fixed elongation occurs in the structure before the stress build-up is imparted to the filaments. Thus, the product is elongated to a degree under increasing loads before stress is imparted to the fibers, depending upon the amount of twist and material provided for compression.

The matrix material, in addition to permitting an extensibleness to a predeterminable desired degree, also acts as protection for the usually low abrasion-resistant glass filaments and limits the inter-filament abrasion so as to impart a longer life to the composite structure than is otherwise obtainable with bare glass fiber yarns. Because of interfilament abrasion, the flex life of bare glass fiber yarns is extremely limited. Beside being limited by high inter-filament abrasion, the flex life of bare glass fiber strands and yarns is short because of the crushing effects of localized stress concentrations and lack of means effecting stress relief.

In view of the foregoing, it is an object of the present invention to provide an extensible textile strand or yarn product made up of filaments of high modulus material such as glass in combination with a low modulus matrix of elastomeric material in a manner so as to impart an extensibility to the composite structure and protection against abrasion for the high modulus filaments, as well as to impart an inherent balance to the product without requirement for a plying with similar structures.

It is another object of the present invention to provide a textile strand structure of glass filaments in combination with a low modulus cushionable material which combination structure is adaptable to having an inherent balance of forces established between the cushionable material and the glass filaments, as well as to provision of an unbalanced condition in the structure to make it useable in the assembly with similar component structures for plying or combination in another sense, with other textile strand components for provision of textile products extending over a wide range of characteristics.

A feature of the invention lies in its provision of a textile strand structure incorporating the high modulus, tensile strength and flex characteristics of glass fibers while yet providing an extensibility in such structure making it conformable and useable for many purpose where either the high modulus or the low modulus materials alone would not be adaptable to use.

Another feature of the invention lies in the wide range of conditions of balance obtainable therewith, correspondingly, making it adaptable to a wide range of textile structures incorporating similar strand components or strand components of still other types.

Another and still further feature of the invention lies in the provision of a textile strand structure which can be inherently balanced without requirement for a plying with other such components.

Other objects and features which we believe to be characteristic of our invention are set forth with particularity in the appended claims. Our invention itself, however, in both organization and manner of construction together with further objects and advantages thereof may be best understood by reference to the following description taken in conjunction with the accompanying drawings in which:

Figures 1, 2, 3, 4, 5:
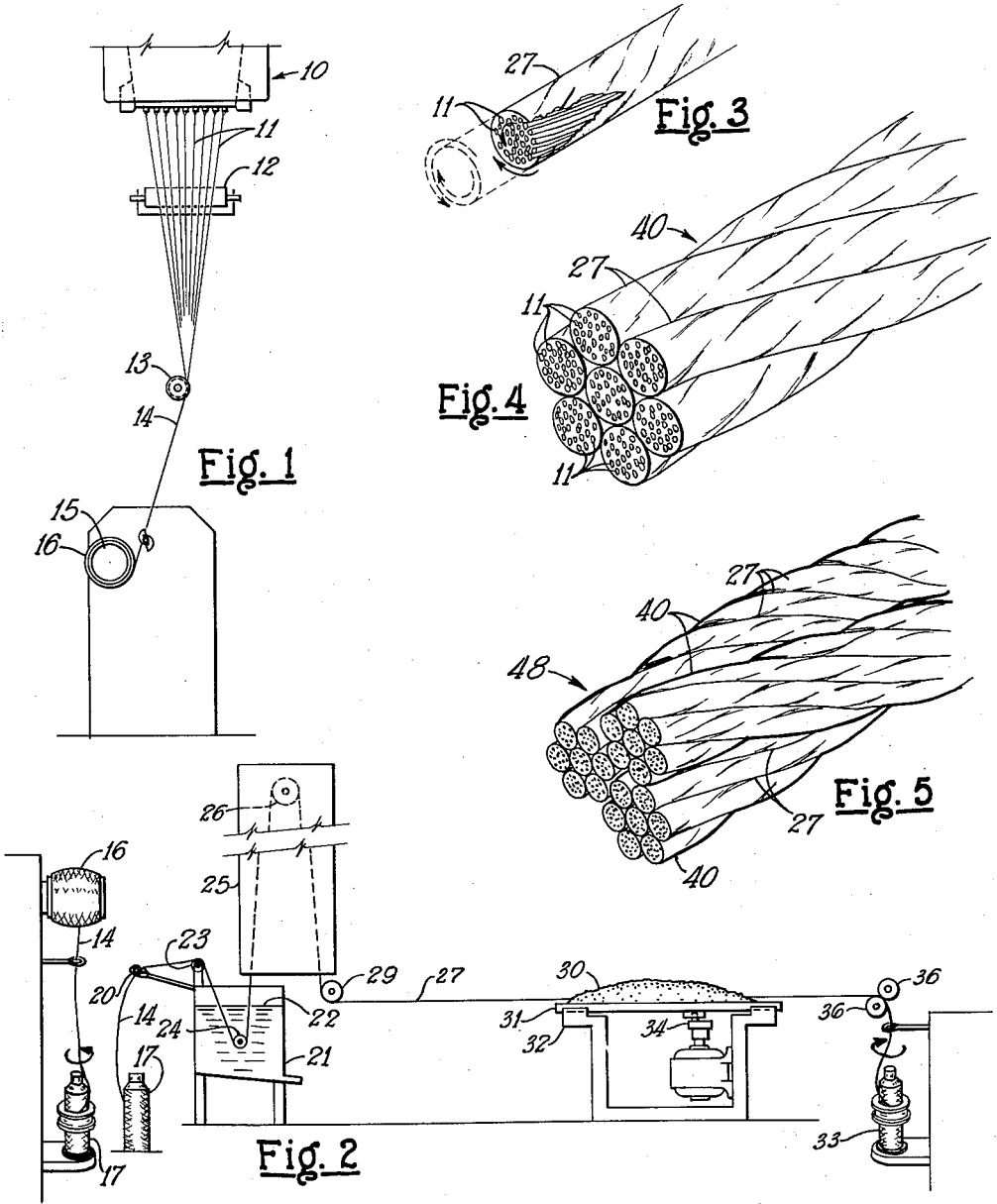
FIGURE 1 is an elevational view of apparatus for producing continuous glass filaments combined into a strand.
FIGURE 2 is a somewhat schematic side elevational view of an arrangement of apparatus for coating strands of continuous glass fibers and for twisting them into a composite yarn structure according to the principles of the present invention.
FIGURE 3 is a broken away cross-sectional and perspective view of a yarn structure of the present invention.
FIGURE 4 is a cross-sectional and perspective view of a plied yarn structure produced according to the principles of the present invention.
FIGURE 5 is a cross-sectional and perspective view of a cord type construction produced according to the principles of the present invention.

Referring to the drawings in greater detail, FIGURE 1 shows a source of molten glass such as a feeder 10 from which streams of molten glass are fed and attenuated into filaments 11 which are then supplied with sizing fluid applied by an applicator such as a roll-type applicator 12. The filaments are then gathered into a strand 14 by passage over a gathering member such as a graphite shoe 13. The force of attenuation of the streams into the continuous fibers or filaments 11 is provided by a winder which collects the strand 14 into a package 16 on a rotating collet 15. Upon completion of the winding cycle, the package 16 is doffed and ready for subsequent processing.

According to the principles of the present invention, the strand package is unwound and the untwisted strand is then processed into a twisted strand or yarn preparatory to further processing into a composite yarn structure 27 which is then subjected to an untwisting operation and wound onto a twister package 33 as shown in FIGURE 2. The composite yarn structure of the present instance is characterized in that the continuous glass filaments are generally separated from each other by the cushionable material which forms a matrix for the resulting unitary strand-like structure as well as an outer sheath for the filaments incorporated therein. The structure is further characterized in the fact that impregnation and coating with the cushionable material is accomplished while the filaments are twisted and then are subjected to an untwisting operation following set of the cushionable material, thereby resulting in a composite yarn in which the forces of the twisted filaments as well as the forces of the twisted cushionable material, act in opposition to each other to provide a more balanced structure.

Referring to FIGURE, 2 the stand 14 of parallel filaments is withdrawn from the package 16 and is subjected to a twisting operation to form a twisted single yarn wound on a bobbin package 17.

The twisted single yarn 14 is subsequently withdrawn from the bobbin package 17 and subjected to an impregnating and coating operation wherein the cushionable material is introduced into the yarn to separate the filaments and to protectively coat the exterior thereof. Impregnation of the strand or yarn 14 is accomplished in a bath 22. The twisted strand is withdrawn from the package 17 and is passed over a relatively small diameter grooved pulley or roll 23 located just above the bath and then down under a second small diameter pulley or roll 24 immersed in the bath 22, whereupon the strand is withdrawn as a coated strand 27 for passage through a setting oven 25. Upon passage over the relatively small pulley or roll 23, the closely bonded relationship of the filaments 11 in the yarn or twisted strand 14 is worked or broken down due both to tension in the strand and the relatively small radius bend in the path of the strand imparted by the pulley which causes a flattening of the strand against the pulley 23 as well as against the pulley 24. Such flattening or working action causes filaments 11 to become separated or loosened from any integrating relation provided by the sizing material.

Loosening of the filaments from this interbonded relation assures a more thorough impregnation of the cushionable bath material through the entire strand structure and a more positive assurance of a coating of each of the filaments 11 contained therein. The further working of the strand upon passage over the immersed pulley 24 further promotes the coating of each of the filaments in the resulting generally circular cross-sectioned strand or yarn 27, so that upon withdrawal of the coated strand from the bath 22, beside positive provision of a sheath of the latex bath material on the strand structure, the structure is also provided with a thorough impregnation which acts to eliminate the tendencies toward abrasive contact of adjacently disposed filaments.

The coated strand 27 is passed through the oven 25 and retained at a curing temperature sufficiently long to establish a set in the latex. A strand is passed through the oven 25 in a double path established by an upper pulley 26 and then withdrawn and redirectioned over a pulley 29. The temperature of the oven is raised to a level such that the coating material does not boil or is otherwise not erratically disturbed during curing. For example, the temperature of the oven may be maintained in the order of 250° F. for an oven length of 12 feet, while the speed of the strand through the oven is in the order of 100 feet per minute. The temperature for latex rubber material which will not generally effect a boiling of moisture therein and which thus will not cause bubbles in the coating due to such boiling is in the order of 250° F.

The cured strand 27 is then passed through a coating powder such as zinc stearate, corn-starch or talc which eliminates the tendency toward tackiness which otherwise frequently results in a sticking or blocking of the strand during twisting and winding. The powdered coating is applied to the strand 27 by vibrating an accumulation of the powder in the path of the strand as the strand moves linearly toward the twister bobbin 33.

Linear movement of the strand through the bath and oven, as well as through the coating mound 30, is effected by a pair of feed rolls 36 which also govern the rate of introduction of the coated strand 27 to the twister bobbin 33. In subjecting the strand to this second twisting operation, however, the original twist in the groups of filaments is reduced, while correspondingly, a twist is imparted to the cushionable impregnating and coating material. The resulting product is a twisted impregnated and coated strand in which the glass filaments are less twisted, but in which the cushionable matrix material has an inherent torque acting on the filaments to balance those provided by reason of the twist existing in the filaments as a group. A more balanced composite structure is thus provided than exists immediately after set of the cushionable material on leaving the curing oven.

The combination of the individual tendency of both the glass filaments as well as the cushionable matrix material to untwist in opposition to each other causes the composite structure to act as a balanced structure without need for further plying with other similar structures.

If, however, the structure is to be plied with similar structures of the same or other materials, any of a wide range of preselectable unbalanced conditions may be imparted thereto depending on the further processing to which it is to be subjected. In this respect, the untwisting operation may be of such character that the twist provided by the cushionable material does not completely balance the twisting forces of the filaments. Still further, however, the untwisting operation may be carried further so that wildness which remains would be present due to the forces of the cushionable material rather than to torque forces of the filaments.

FIGURE 3 illustrates with greater clarity the structural arrangement of the continuous filaments 11 within the twisted matrix of the low modulus material. The filaments 11 are twisted in a counterclockwise direction as illustrated by the central solid arrow, while the cushionable material impregnated therebetween and coating the exterior of the structure is twisted in a clockwise direction as illustrated by the outside solid arrow. The forces exerted by the twisted filaments are untwisting forces and are thus exerted in a clockwise direction as illustrated by the dotted interior arrow in FIGURE 3. Correspondingly, the forces exerted by the cushionable impregnating and coating material are forces which act to return the cushionable material to its original set condition and thus act in a counter-clockwise direction as illustrated by the exterior dotted arrow in FIGURE 3. If during the filament untwisting operation, following the set of the cushionable material, the untwist is effected to the degree that the force exerted by the cushionable material to return to its condition of original set equals the force exerted by the filaments to continue the untwisting to a straight parallel alignment of filaments, then the structure is neutralized since the internal forces exerted thereby balance each other. Any of a wide range of twisting forces can be incorporated in the structure depending on the degree of untwisting effected. In some instances it may be desirable that the untwisting be carried on to the point where the filaments are in straight parallel alignment rather than in twisted alignment, thereby developing an internal force in the structure which is completely reliant on the twist in the cushionable material.

Extensibility is imparted to the structure of FIGURE 3 by reason of the space between the filaments 11 within the matrix when the filaments 11 are allowed to retain a twisted condition. That is, upon application of lineal forces to the unitary structure 27 when the filaments 11 therein are twisted, the twist acts to impart a radially inward force so that the filaments displaceably squeeze the impregnated cushion material from between the filaments. In other words, because of the twist in the filaments, axial force components on the structure 27 act to contract the overall diameter of the group of filaments within the matrix, and correspondingly result in an extension of the total structure without substantially stretching the glass filaments themselves. In this sense, the impregnant acts as a separator for the filaments, but a separator which is sufficiently mobile so that the filaments can be drawn closer together upon application of the lineal forces to the structure 27. The amount of twist in the individual composite structure 27, it has been found, is an important factor as indicated above in determining the degree of extensibility. Twist translates the linear applied forces to radially inward acting forces to squeeze the impregnant from between the filaments 11. The more the twist within the limits of non-looping, the greater the extensibility provided.

Examples of cushionable coating materials suitable for impregnation and coating of the strand structure of the present invention beside including rubber latexes either of a natural or synthetic character such as acrylic, silicone, and fluorocarbon rubbers, also include copolymers of styrene and butadiene, copolymers of acrylonitryl butadiene, chlorinated polyethylene, polyvinyl chloride, and the polyamids.

High modulus filaments of materials such as glass, quartz, and other ceramic materials, as well as resin materials or specially processed natural fibrous materials such as regenerated cellulosic materials like Fortisan are adaptable for incorporation in the structure of this invention.

The concept of utilizing the cushionable matrix material to provide extensibility in the composite structure 27 can be amplified by inuorporating a plurality of the single strand structures 27 into a multiple strand structure like that shown in FIGURE 4. In incorporating the composite structure 27 in such a structure, the degree of balance desired in the yarn structure can be determined by two component factors in the present invention, namely, the unbalance of the structure 27 due to either the twist in the filaments 11 or the torsion forces in the cushionable material impregnating and coating the filaments. Thus, a wide range of capabilities for various characteristics in the yarn structure are permitted with the composite structure 27.

Extensibility is magnified in such a plied yarn structure since it utilizes the cushionability of the sheath of each individual strand structure 27 to promote the extensibility, in addition to the displaceability of the cushionable material from between filaments. That is, besides utilizing the individual extensibility of the single strands 27 to impart extensibility to the combination of such strand in a yarn 40, combination of the two or more strands in an assembly structure such as a plied yarn provides a greater extensibility than is obtainable from a single strand structure by reason of the displaceability of the sheath of the strands in the assembly, besides the displaceability of the material disposed between adjacent filaments in each individual strand structure when lineal forces are exerted on the assembly or combination structure.

When a force is exerted lineally on the structure shown in FIGURE 4, the sheaths of cushionable material on the strands 27 are squeezed so that they fill the spaces between the strands as well as being squeezed from between the strands when such spaces are taken up. Thus, the total of the three groups of filaments 11 of the combination structure is in a sense contracted into a smaller space, while the matrix of the material of the individual strand structures 27 acquire a new orientation and the total yarn structure 40 becomes longer. The greater the space between filaments of the individual strand structures 27 and the greater the amount of sheathing material of cushionable character provided on the exterior of each strand 27 (and correspondingly the greater spacing between the groups of filaments 11 provided by the sheaths) the greater is the extensibility of the plied yarn structure.

The concept of extensibility and balance of torsion forces of the cushionable material and the twisted filaments in a plied structure can be amplified still further in a cord or cable-type structure in view of the greater amount of contractibility permissible by the greater amount of cushionable material therein. As shown in FIGURE 5, a cable-type structure 48 can be made up of a plurality of structures 40 all assembled and plied together into the unitary structure with a multiplicity of vacant spaces between the basic composite structures 27 incorporated therein. Thus, upon exertion of longitudinal forces, the structure 48 has a capability of contraction percentage-wise to a much smaller diameter than a single strand or yarn component because of both the displaceability of the cushionable material between filaments as well as the take-up of the spaces between the structures 27 incorporated therein. Likewise, fabrics of such composite constructions can be imparted even greater extensibility because of their utilization of the greater extensibility of yarns over individual monofilament elements, as well as added extensibility due to displaceability of contacting sheaths of the interwoven composite yarn constructions incorporated therein.

Tests of composite constructions made according to the present invention reveal increases in strength of the composite structures over the bare glass structures by approximately 40%, while extensibility was increased approximately 37½%. Extensibility of yarn structures were increased to the range of 6 to 8%, while fabrics made of such composites were increased to the range of from 10% to 12%, whereas corresponding fabrics of non-cushionable coated glass fibers were extensible to less than 2%.

While we have shown certain particular forms of our invention, it will be understood that many modifications may be made within the concept of the invention without deviating from the scope thereof. For example, a unitary strand structure of the type shown in FIGURE 3 may be plied into a yarn structure such as that of FIGURE 4 incorporating with the glass fiber strands, strands of different material such as strands of natural fibers like cotton, or strands of other synthetic materials such as nylon and Dacron to still further enhance the capabilities of the composite structure for specific purposes. A conventional strand of glass fibers may also be plied with a unitary strand structure such as strand 27 of FIGURE 3, or a staple-type yarn structure might be plied to advantage with such a unit. We therefore contemplate by the appended claims to cover all such modifications which fall within the true spirit and scope of our invention.

We claim:

1. An extensible fibrous glass textile strand product comprising a group of continuous glass filaments, a unitary matrix of cushionable material encompassing the filaments of said group, said group of glass filaments being spirally twisted on itself within said matrix and having internal stresses acting to effect a self-untwisting of said group, and said cushionable matrix material being twisted from a set condition in a direction opposite to that of said group of filaments establishing self-untwisting stresses in the matrix material acting in opposition to the self-untwisting action of said group of filaments.

2. An extensible fibrous glass textile strand component comprising a group of continuous glass filaments, a unitary matrix of cushionable material encompassing the filaments of said group, said group of glass filaments being spirally twisted on itself within said matrix and having internal stresses acting to effect a self-untwisting of the group, the filaments of said group being generally spaced and retained in position from each other by said cushionable matrix material, and said cushionable matrix material being twisted from a set condition in a direction opposite to that of said group of filaments establishing self-untwisting stresses in the matrix material acting in opposition to the self-untwisting action of said group of filaments.

3. A method for producing an extensible fibrous glass textile strand product comprising impregnating and coating with a low modulus cushionable matrix material a fibrous glass strand of twisted continuous glass filaments of character such that it tends to untwist from such twisted condition, setting said matrix material, and then untwisting the glass filaments as a group with said matrix material in set condition to develop internal torsion forces in the matrix material acting in opposition to untwisting forces exerted by the glass filaments.

4. A method for producing an extensible fibrous glass textile strand product comprising impregnating and coating with a low modulus cushionable material a fibrous glass strand of unbalanced twisted continuous glass filaments, said impregnation being effected to the degree that the filaments are generally separated by the impregnating cushionable material, setting said cushionable material while said strand of filaments is in twisted condition, and subjecting the impregnated and coated cushionable material to an untwisting operation to the degree that the cushionable material develops internal torsional stress forces opposing the untwisting of the group of continuous glass filaments.

5. A method for producing an extensible fibrous glass textile strand product comprising twisting a strand of parallel aligned continuous glass filaments, impregnating and coating with a low modulus cushionable material the twisted strand of continuous glass fibers, said impregnation being effected to the degree that said filaments are substantially separated by the impregnating cushionable material, setting said cushionable material, and imparting an axial untwist to said impregnated and coated strand to develop stress forces in the cushionable matrix and coating material which forces are opposite to the internal stress forces of the group of continuous filaments acting to effect an untwist thereof.

6. A method for producing an extensible fibrous glass textile strand product comprising forming a group of continuous glass filaments, applying sizing material to each of said filaments, gathering said group of filaments into a common strand in which said filaments are aligned in parallel relation, twisting said strand of filaments along its length, impregnating the twisted strand with a low modulus cushionable material, setting said cushionable material, and then at least partially untwisting said impregnated group of filaments to develop opposing internal stress forces in said matrix material.

References Cited in the file of this patent

UNITED STATES PATENTS

| | | |
|---|---|---|
| 2,133,238 | Slayter et al. | Oct. 11, 1938 |
| 2,770,940 | Morrison et al. | Nov. 20, 1956 |
| 2,775,860 | Morrison | Jan. 1, 1957 |
| 2,799,598 | Biefeld et al. | July 16, 1957 |
| 2,800,761 | Owens | July 30, 1957 |
| 2,842,932 | Owens | July 15, 1958 |
| 2,842,934 | Owens | July 15, 1958 |